United States Patent
Goto et al.

(10) Patent No.: US 6,885,310 B2
(45) Date of Patent: *Apr. 26, 2005

(54) PHASE DIFFERENCE DETECTION DEVICE AND METHOD FOR A POSITION DETECTOR

(75) Inventors: Atsutoshi Goto, Shinmachi 1-77-2, Fuchu-shi, Tokyo-to (JP); Yasuhiro Yuasa, Fuchu (JP); Shuichi Tanaka, Sagamihara (JP); Nobuyuki Akatsu, Higashiyamato (JP); Kazuya Sakamoto, Hamura (JP); Hiroshi Sakamoto, Kawagoe (JP); Akio Yamamoto, Kunitachi (JP)

(73) Assignee: Atsutoshi Goto, Tokyo (JP)

( * ) Notice: Subject to any disclaimer, the term of this patent is extended or adjusted under 35 U.S.C. 154(b) by 219 days.

This patent is subject to a terminal disclaimer.

(21) Appl. No.: 10/379,269

(22) Filed: Mar. 3, 2003

(65) Prior Publication Data

US 2003/0146849 A1 Aug. 7, 2003

Related U.S. Application Data

(63) Continuation of application No. 09/479,605, filed on Jan. 6, 2000, now Pat. No. 6,552,666, which is a continuation-in-part of application No. 08/818,974, filed on Mar. 14, 1997, now Pat. No. 6,034,624.

(30) Foreign Application Priority Data

Mar. 16, 1996 (JP) .............................. 8-087613

(51) Int. Cl.[7] .......................... G08C 19/12; G08C 19/06
(52) U.S. Cl. ........................... 340/870.31; 340/870.32; 324/207.11; 318/599
(58) Field of Search .................. 340/870.31, 870.32, 340/870.36; 324/207.11, 207.16, 207.25; 318/599, 652, 656

(56) References Cited

U.S. PATENT DOCUMENTS

| | | | |
|---|---|---|---|
| 3,648,042 A | | 3/1972 | Perrett |
| 3,789,393 A | | 1/1974 | Tripp |
| 4,011,440 A | | 3/1977 | Steglich |
| 4,712,106 A | | 12/1987 | McNally |
| 4,757,244 A | * | 7/1988 | Iwamoto et al. ............. 318/652 |
| 5,627,441 A | * | 5/1997 | Sakurai et al. .............. 318/599 |
| 5,710,509 A | | 1/1998 | Goto et al. |
| 6,034,624 A | * | 3/2000 | Goto et al. ............. 340/870.32 |
| 6,552,666 B1 | * | 4/2003 | Goto et al. ............. 340/870.32 |

* cited by examiner

*Primary Examiner*—Timothy Edwards, Jr.
(74) *Attorney, Agent, or Firm*—Morrison & Foerster LLP

(57) ABSTRACT

Two A.C. output signals amplitude-modulated in accordance with two function values (sine and cosine) differing from each other in correspondence to a position-to-be-detected are received from a position sensor such as a resolver. By performing an addition or subtraction between a signal derived by shifting the electric phase of one of the received A.C. output signals by a predetermined angle, and the other received signal, two electric A.C. signals ($\sin(\omega t \pm d + \theta)$, $\sin((\omega t \pm d - \theta))$) are electrically synthesized which have electric phase angles ($\theta$) corresponding to the position-to-be-detected and are phase-shifted in opposite directions. "$\pm d$" here represents phase variation error caused by factors, other than the position-to-be-detected, such as temperature change. In the synthesized two signals, the phase variation errors ($\pm d$) appear in the same direction, while the phase differences ($\theta$) corresponding to the position are shifted in opposite, positive and negative, directions. Thus, by measuring the respective phase shift amounts ($\pm d + \theta$, $\pm d - \theta$) and performing appropriate operation, it is allowed to cancel out or extract the error ($\pm d$) so that an accurate phase difference ($\theta$) can be detected. Position detection data indicative of the detected phase difference ($\theta$) is converted into a pulse-width-modulated signal and transmitted in the pulse-width-modulated form.

8 Claims, 10 Drawing Sheets

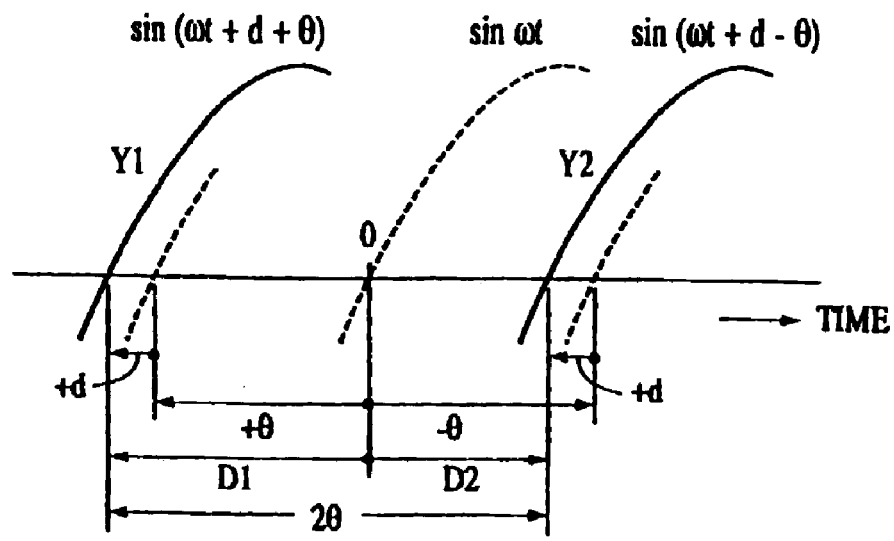
F I G. 4 A
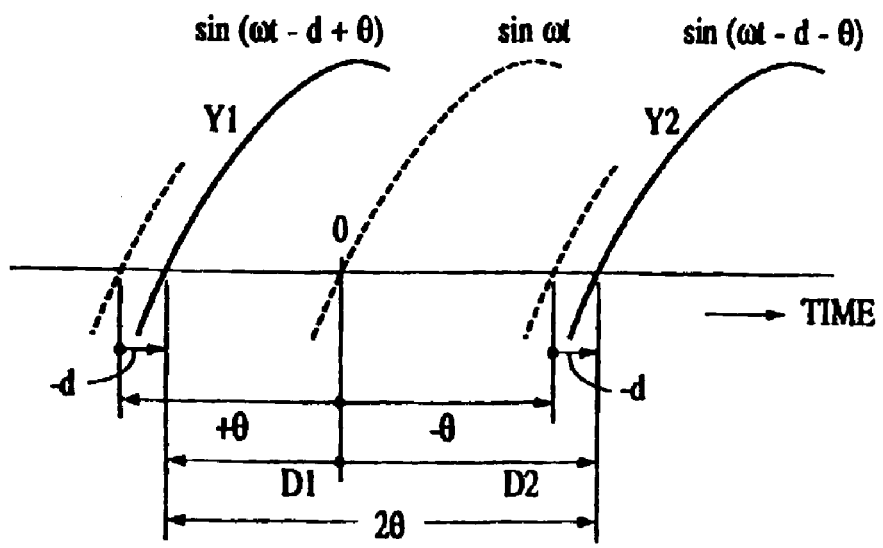
F I G. 4 B

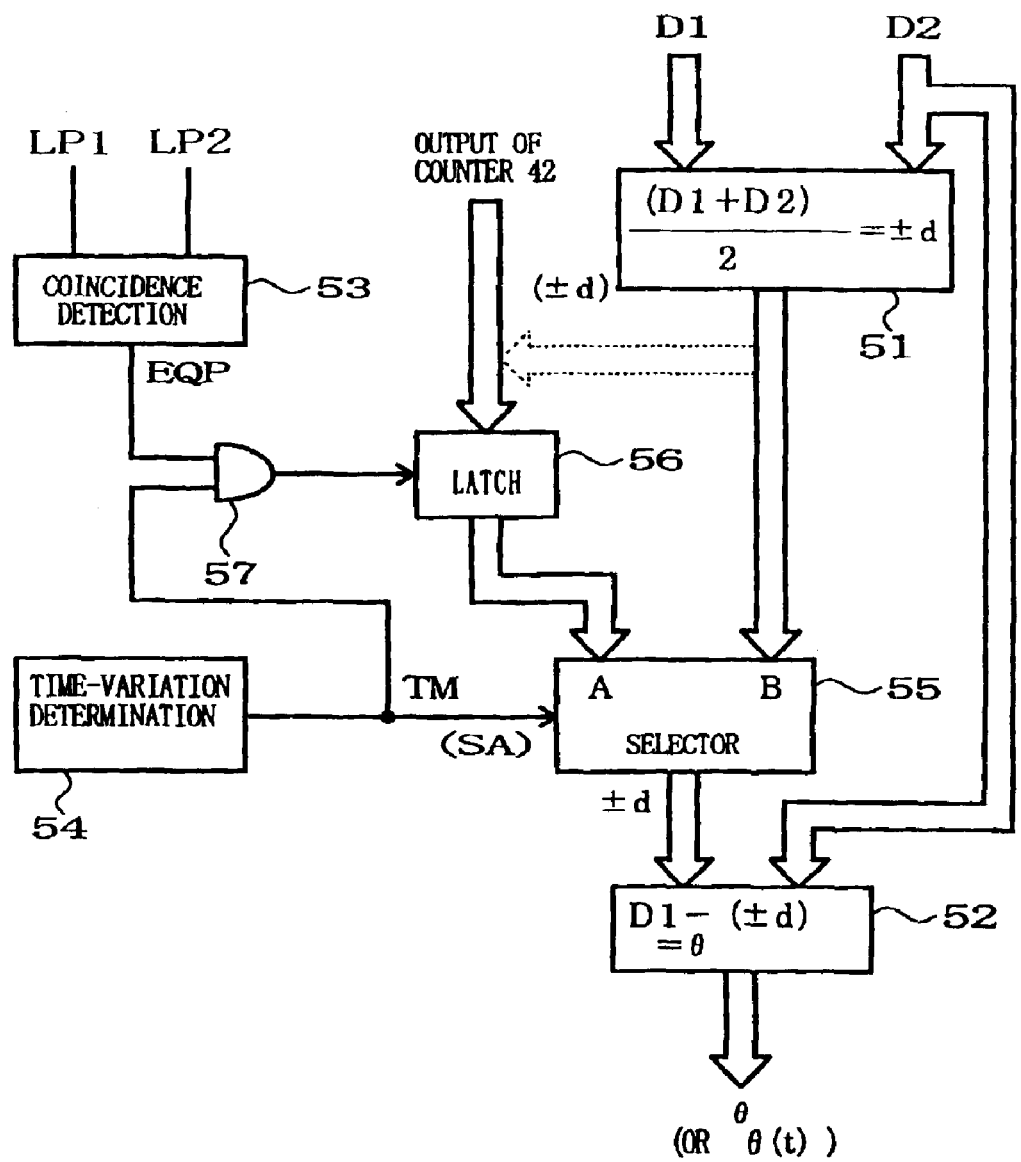
F I G. 5

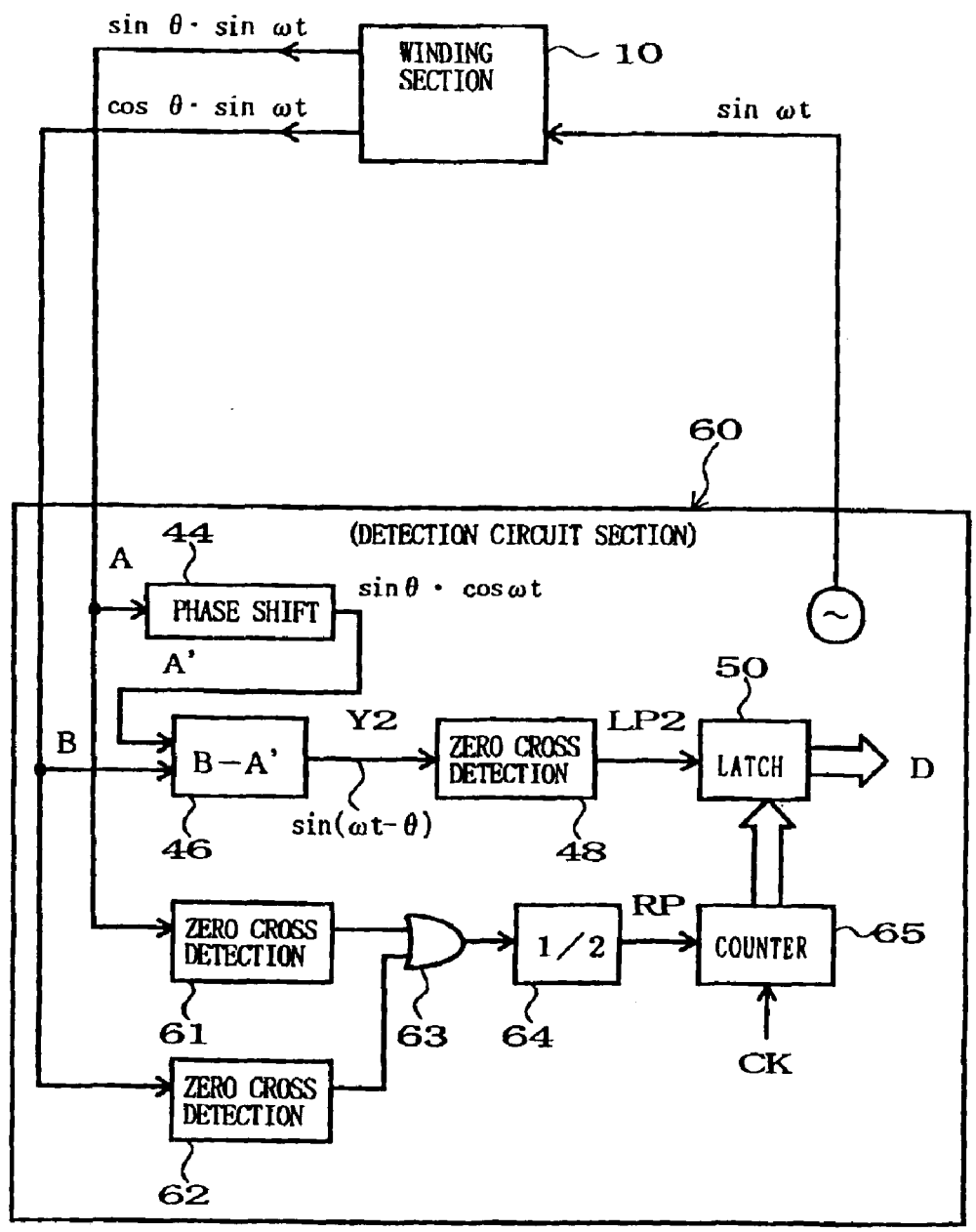
F I G. 6

F I G. 7A
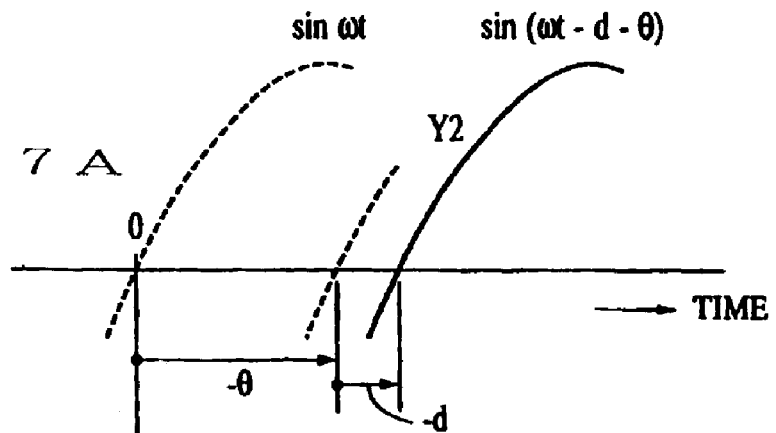
F I G. 7B
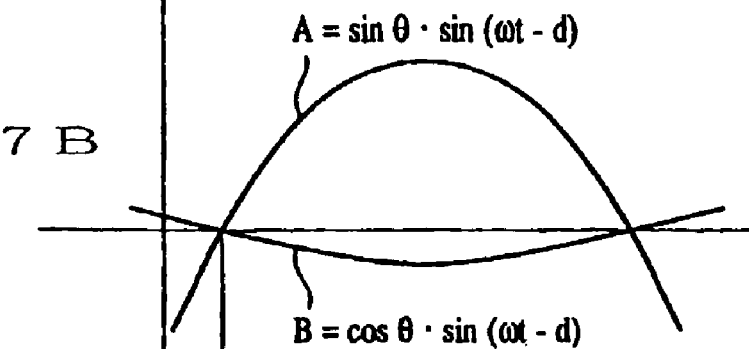
F I G. 7C
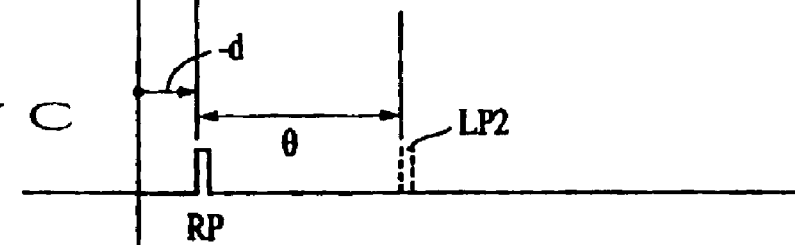

PHASE DIFFERENCE DETECTION DEVICE AND METHOD FOR A POSITION DETECTOR

RELATED APPLICATIONS

This application is a continuation of U.S. application Ser. No. 09/479,605, filed on Jan. 6, 2000, now U.S. Pat. No. 6,552,666, which in turn is a continuation-in-part application of U.S. application Ser. No. 08/818,974 filed Mar. 14, 1997, now U.S. Pat. No. 6,034,624.

BACKGROUND OF THE INVENTION

The present invention relates to a phase difference detection device and method for use in position detection and a position detection system which are applicable to detection of both rotational positions and linear positions, such as a rotational position detector like a resolver or synchro, or a linear position detector based on a similar position detecting principle. More particularly, the present invention relates to a technique to detect an absolute position on the basis of an electric phase difference.

Among various induction-type rotational position detectors, one which produces two-phase (sine phase and cosine phase) outputs in response to a single-phase exciting input is commonly known as a "resolver", and others which produce a three-phase (phases shifted 120° in relation to one another) outputs in response to a single-phase exciting input is known as a "synchro". The oldest-fashioned resolvers have double-pole (sine pole and cosine pole) secondary windings provided on the stator in such a manner as to cross each other at a mechanical angle of 90°, with a primary winding provided on the rotor (the relationship between the primary and secondary windings may be reversed depending on a desired application). However, the resolvers of this type are disadvantageous in that they require brushes for electric contact with the primary winding on the rotor. Brushless resolvers eliminating the need for such brushes are also known, where a rotary transformer is provided on the rotor in place of the brushes.

R/D converters have long been known as a detection system which obtains position detection data in digital form by use of a resolver which produces a two-phase (sine phase and cosine phase) outputs in response to a single-phase exciting input.

U.S. Pat. No. 3,648,042 discloses a technique which provides a rotation angle detection signal of a resolver as an analog voltage signal. Further, U.S. Pat. No. 4,011,440 discloses a technique which generates, on the basis of an output signal from a resolver, a cyclic square-wave signal having a pulse width corresponding to a detected angle and provides an angular rate on the basis of differences between pulse widths in individual cycles.

Another detection system is also known, where the resolver exciting method is modified to produce a single-phase output in response to two-phase exciting inputs so that an output signal containing an electric phase difference angle corresponding to rotational angle θ is obtained to thereby derive digital data indicative of a detected angle θ. Specific examples of the above-mentioned phase difference detection system are disclosed in U.S. Pat. Nos. 4,754,220, 4,297,698, etc.

As known in the art, windings of a sensor such as the resolver tend to undesirably change in impedance under the influence of ambient temperature change, and thus electric phase of A.C. signals induced in a secondary winding subtly fluctuates in response to the temperature change. Additionally, the electric phase of the induced A.C. signals received by a detection circuit varies under the influence of various factors other than a position-to-be-detected, such as ununiform wiring lengths between the windings of the sensor and the detection circuit and delays in various circuit operations. If the phase variation based on the various factors, other than the position-to-be-detected, such as the temperature change is expressed by "±d" for convenience of description, in the former-type detection system, i.e., the R/D converter, the variation amount "±d" is in effect cancelled out and hence has no effect at all on the detecting accuracy. Therefore, it can be seen that the detection system like the R/D converter is a high-accuracy system insusceptible to adverse influence of the ambient temperature change. However, because this detection system is based on a so-called "successive incrementing method" where, as noted earlier, a reset trigger signal is periodically applied to a sequential phase generation circuit at optional timing to reset a phase angle φ to "0" so as to initiate incrementing of the angle φ, and the incrementing of the phase angle φ is stopped upon arrival at "0" of the output of a subtracter to thereby obtain digital data indicative of a detected angle θ, it has to wait for a period from the time when the reset trigger is given to the time when the phase angle φ coincides with the detected angle θ and hence presents poor response characteristics.

On the other hand, in the latter-type detection system, the phase variation amount "±d" based on the non-positional factors (other than the position-to-be-detected) such as temperature change presents a very significant problem that the variation "±d" directly appears as a detection error.

The scheme of generating phase detection data in digital representation permits a high-accuracy detection, but is disadvantageous in that it would require an increased number of detection-signal transmitting lines if the digital detection data are transmitted directly in a parallel fashion.

SUMMARY OF THE INVENTION

It is therefore an object of the present invention to provide a phase difference detection device and method for use with a position detector which can perform a high-accuracy position detection without being influenced by unwanted phase variation caused by various factors, other than a position-to-be-detected, such as impedance change in a position sensor due to temperature change, which presents superior high-speed response characteristics, or which can significantly simplify detection-signal transmission lines and also minimize adverse influences of external disturbances, such as temperature changes, on the detection signal on the transmission lines.

In order to accomplish the above-mentioned object, the present invention provides a phase difference detection device for a position detector, said position detector being excited by a predetermined reference signal to generate first and second A.C. output signals, said first A C. output signal having been amplitude-modulated using, as an amplitude coefficient, a first function value corresponding to a position-to-be-detected, and said second A.C. output signal having been amplitude-modulated using, as an amplitude coefficient, a second function value corresponding to the position-to-be-detected, said phase difference detection device comprises: a phase shift circuit operatively coupled to said position detector to shift an electric phase of said received first A.C. output signal by a predetermined angle; a first circuit operatively coupled to said phase shift circuit and said position detector to perform an operation between an output signal of said phase shift circuit and said second A.C. output signal so as to synthesize a first data signal having an electric phase angle shifted in one of positive and negative directions in correspondence to the position-to-be-detected; a second circuit operatively coupled to said phase shift circuit and said position detector to perform an operation between an output signal of said phase shift circuit and said second A.C. output signal so as to synthesize a second data signal having an electric phase angle shifted in other of positive and negative directions in correspondence to the position-to-be-detected; a first operation circuit operatively coupled to said first circuit to measure an electric phase difference between said predetermined reference signal and said first data signal to obtain first phase data; a second operation circuit operatively coupled to said second circuit to measure-an electric phase difference between said predetermined reference signal and said second data signal to obtain second phase data; a third operation circuit operatively coupled to said first and second operation circuit to calculate position detection data corresponding to the position-to-be-detected on the basis of said first and second phase data; and a pulse-width modulation circuit coupled to said third operation circuit to generate a signal pulse-width-modulated in accordance with the position detection data.

The position detector generates the first and second output signals (e.g., sin θ·sin ωt and cos θ·sin ωt) amplitude-modulated by two different function values in correspondence to the position-to-be-detected (x) is a known detector or sensor such as a resolver. The present invention is characterized in that output signals from such a known position detector (i.e., output signals to which phase-modulation corresponding to the position-to-be-detected has not been applied) is input to the device for detection of a phase difference thereof so that an absolute position can be detected on the basis of the phase difference detection, and the detected absolute position data is converted to a pulse-width-modulated signal for transmission.

Namely, by performing an addition and/or subtraction between the output signal (sin θ·cos ωt) derived by shifting the electric phase of the first A.C. output signal received from the position detector by a predetermined angle and the second A.C. output signal (cos θ·sin ωt), the first and second data signals (e.g., sin(ωt+θ) and sin(ωt−θ)) are synthesized which have an electric phase angle corresponding to the position-to-be-detected. In a specific example, the first data signal (sin(ωt+θ)) phase-shifted in a positive direction can be synthesized on the basis of the addition, e.g., (sin θ·cos ωt+cos θ·sin ωt), while the second data signal (sin(ωt−θ)) phase-shifted in a negative direction can be synthesized on the basis of the subtraction, e.g., (−sin θ·cos ωt+cos θ·sin ωt).

If a fundamental time-varying phase of the obtained A.C. signal is represented by "ωt" and phase variation caused by impedance change of the detector's wiring due to temperature change and other factors than the position-to-be-detected (i.e., non-positional factors) is represented by "±d", then the first data signal may be expressed as "sin(ωt±d+θ)" and the second data signal as "sin(ωt±d−θ)". That is, the electrical phase differences (θ), corresponding to the position-to-be-detected (x), for the first and second data signals appear as opposite (positive and negative)-direction phase shifts. However, the phase variations "±d" for both of the first and second data signals have effects in the same positive or negative direction depending on the current conditions. Thus, by measuring the respective phase differences "(±d+θ)" and "(±d−θ)" of the first and second data signals and performing an appropriate operation such as an addition and/or subtraction on the measured differences, it is allowed to cancel out or extract the phase variation "±d" and also detect the phase difference (θ) free of the phase variation "±d" which accurately corresponds to the position-to-be-detected (x).

The detected phase difference (θ), i.e., position detection data, is pulse-with-modulated via a pulse-width modulation circuit, to provide a pulse-width-modulated position detection signal having a pulse with corresponding to the phase difference (θ). The pulse-width-modulated position detection signal is then supplied via transmission wirings or lines to another device utilizing the signal (hereinafter called a "utilizing device"). Transmission of the detected position data in the form of the pulse-width-modulated position detection signal is advantageous in that it can simplify the transmission wirings or lines and prevent voltage level variations of the signal, due to various adverse influences on the signal passing through the wirings such as impedance variations by the influence of wiring capacity, noise and temperature changes, from causing errors to the position detection signal, thereby constantly guaranteeing a high detection accuracy.

Consequently, the present invention permits a high-accuracy position detection without being influenced by various factors, other than the position-to-be-detected, such as impedance change of the sensor due to temperature change and ununiform lengths of wiring cables. Further, because the present invention is based on the technique of measuring a phase difference (θ) in A.C. signals, the instant latching method may be employed rather than the conventional successive incrementing method, and thus the invention can achieve a phase difference detection device or method which presents superior high-speed characteristics. In addition, by transmitting the detected position data in the form of the pulse-width-modulated position detection signal as mentioned above, there is achieved the superior benefit that the transmission wirings or lines can be significantly simplified and various adverse influences on the signal passing through the wirings can be reliably avoided.

In one implementation, the third operation circuit may calculate the position detection data as analog-position detection data, and the pulse-width modulation circuit may include an analog circuit for processing the analog position detection data.

Alternatively, the third operation circuit may calculate the position detection data as digital position detection data, and the pulse-width modulation circuit may include a digital circuit for processing the digital position detection data.

In another alternative, the third operation circuit may calculate the position detection data as digital position detection data, and the phase difference detection device further may include a converter for converting the digital position detection data into analog position detection data. In this case, the pulse-width modulation circuit may include an analog circuit for processing the analog position detection data.

According to another aspect of the present invention, there is provided a phase difference detection device for a position detector, the position detector being excited by a predetermined reference signal to generate first and second A.C. output signals, the first A C. output signal having been amplitude-modulated using, as an amplitude coefficient, a first function value corresponding to a position-to-be-detected, and the second A.C. output signal having been amplitude-modulated using, as an amplitude coefficient, a second function value corresponding to the position-to-be-detected, which is characterized by comprising: a phase shift circuit operatively coupled to the position detector to shift an electric phase of the received first A.C. output signal by a predetermined angle; a first circuit operatively coupled to the phase shift circuit and the position detector to perform an operation between an output signal of the phase shift circuit and the second A.C. output signal so as to synthesize a first data signal having an electric phase angle shifted in one of positive and negative directions in correspondence to the position-to-be-detected; a second circuit operatively coupled to the phase shift circuit and the position detector to perform an operation between an output signal of the phase shift circuit and the second A.C. output signal so as to synthesize a second data signal having an electric phase angle shifted in other of positive and negative directions in correspondence to the position-to-be-detected; and a third circuit operatively coupled to the first and second circuit to generate, on the basis of a difference between the first data signal and the second data signal, a signal pulse-modulated in accordance with position data indicative of the position-to-be-detected.

The present invention may be constructed and implemented not only as the above-mentioned device invention but also as a method invention. The method may be arranged and implemented as a program for execution by a computer, microprocessor or the like, as well as a machine-readable storage medium storing such a program.

For better understanding of the features of the present invention, the preferred embodiments of the invention will be described below with reference to the accompanying drawings.

BRIEF DESCRIPTION OF THE DRAWINGS

In the accompanying drawings:

FIGS. 4A and 4B are diagrams explanatory of the operation of the device shown in FIG. 3;

FIG. 5 is a block diagram illustrating a modified embodiment of the phase difference detection device according to the present invention to be attached to the device shown in FIG. 3;

FIG. 6 is a block diagram illustrating another embodiment of the phase difference detection device according to the present invention;

FIGS. 7A to 7C are diagrams explanatory of the operation of the device shown in FIG. 6;

DETAILED DESCRIPTION OF THE PREFERRED EMBODIMENTS

Figure 1:
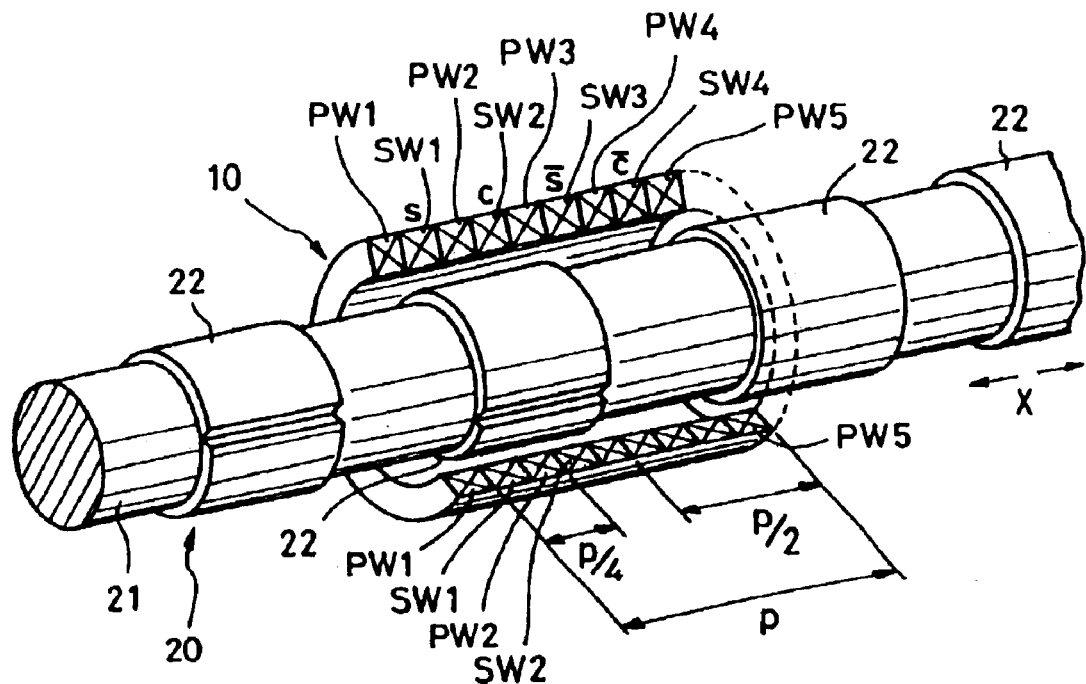
FIG. 1 is a perspective view, with parts broken away, of an example of a linear position detector device which is applicable to a phase difference detection device according to the present invention.

FIG. 1 is a perspective view of an example of a linear position detector device which is applicable to a phase difference detection device according to the present invention. The linear position detector device generally comprises a winding section 10 and a variable magnetic coupling section 20. The variable magnetic coupling section 20, which is coupled to a predetermined mechanical system (not shown) that is an object of detection by the detector device, is capable of linearly reciprocating in response to a varying linear position of the mechanical system. On the other hand, the winding section 10 is positionally fixed in a suitable manner. Thus, the variable magnetic coupling section 20 linearly moves relative to the winding section 10, in response to a varying linear position of the mechanical system to be detected (object of detection). Conversely, the winding section 10 may be constructed to move in response to a varying linear position of the mechanical system to be detected, with the variable magnetic coupling section 20 fixed in position. In short, this detector device is constructed to detect a linear position of the variable magnetic coupling section 20 relative to the winding section 10. The direction of such a relative linear displacement is denoted in FIG. 1 by a double-head arrow X.

The winding section 10 includes primary windings PW1 to PW5 which are excited by a common single-phase A.C. signal, and secondary windings SW1 to SW4 provided at different locations with respect to the linear displacement direction X. The winding section 10 is shown in partial cross section in FIG. 1 to clearly illustrate the structural relationships between the first and second windings; actually, the winding coils of the winding section 10 are disposed on the rod-shaped variable magnetic coupling section 20 with an appropriate gap left therebetween as additionally denoted by dotted line. Because the primary windings PW1 to PW5 are excited by the common single-phase A.C. signal in the instant embodiment, either an integrally formed single winding or a predetermined plurality of discrete windings may be arranged in any suitable manner. However, it is preferable that the predetermined primary windings PW1 to PW5 be arranged in such a manner that each of the secondary windings SW1 to SW4 is interposed between adjacent primary windings PW1 to PW5, because magnetic fields generated by the primary windings can effectively operate on or influence the individual secondary windings SW1 to SW4 and later-described magnetic response members 22 of the variable magnetic coupling section 20 can effectively influence the magnetic fields.

The linear or rod-shaped variable magnetic coupling section 20 includes a base rod section 21, on which a plurality of the magnetic response members 22 having a predetermined magnetic response characteristic are provided at a predetermined pitch p along the linear displacement direction X. As already known in the art, the magnetic response members 22 may be made of any suitable material such as a magnetic material like iron or nickel, or non-magnetic, electrically conductive material like copper or aluminum, in such a manner that they assume a predetermined magnetic response characteristic such as in magnetic permeability, reluctance or eddy-current loss. The base rod section 21 may also be made of any suitable material such as a magnetic material, non-magnetic material or electrically conductive material, depending on a particular material and/or shape of the magnetic response members 22. In other words, it is only sufficient that magnetic response characteristics influencing the winding section 10 differ between the place where the magnetic response member 22 is present and the place where the magnetic response member 22 is not present. The formation, of the magnetic response members 22, on the rod section 21 may be done by any suitable known method, such as pasting, adhesive bonding, caulking, cutting, plating, vacuum evaporation and baking. The rod section 21 may be made of a flexible material such as flexible wire, rather than a rigid material.

As the magnetic response members 22 of the variable magnetic coupling section 20 change their positions relative to the winding section 10 in response to a varying linear position of the object of detection, magnetic coupling between the primary windings PW1 to PW5 and the secondary windings SW1 to SW4 are also changed in response to the varying linear position of the object of detection. Consequently, inductive A.C. output signals amplitude-modulated in accordance with the linear position of the object of detection occur are produced in the secondary windings SW1 to SW4, with amplitude function characteristics differing depending on the respective locations of the secondary windings SW1 to SW4. Because the primary windings PW1 to PW5 are excited by a single-phase A.C. signal, the inductive A.C. output signals occurring in the secondary windings SW1 to SW4 are identical in electrical phase and each of their amplitude functions periodically changes in such a manner that a displacement amount corresponding to one pitch length p between the magnetic response members 22 represents one cycle of the periodical change.

The four secondary windings SW1 to SW4 are disposed at predetermined intervals within a range of one pitch length p of the magnetic response members 22, and set in such a manner that the inductive A.C. output signals produced in the individual secondary windings SW1 to SW4 present desired amplitude function characteristics. For example, if the detector device is constructed as a resolver-type position detector, the amplitude function characteristics of the inductive A.C. output signals produced in the individual secondary windings SW1 to SW4 are set to represent a sine function, cosine function, minus sine function and minus cosine function, respectively. For example, as shown in FIG. 1, the range of one pitch length p is divided into four segments, and the secondary windings SW1 to SW4 are positioned in the four segments displaced from each other by an amount "p/4". By so doing, the amplitude function characteristics of the inductive A.C. output signals produced in the individual secondary windings SW1 to SW4 are set to represent a sine function, cosine function, minus sine function and minus cosine function, respectively. Of course, the respective locations of the individual windings can be varied subtly depending on various conditions; thus, the embodiment is designed so as to ultimately obtain desired amplitude function characteristics by adjusting the locations of the individual windings or by adjusting secondary output levels through electrical amplification.

In the situation where the output from the secondary winding SW1 represents a sine function (denoted by "s" in the figure), the secondary winding SW3 displaced from the winding SW1 by an amount of "p/2" provides an output representing a minus sine function /s (the mark "/" in the text corresponds to the upper short bar in the figure); in this case, a first A.C. output signal having a sine amplitude function is provided by differentially synthesizing the two outputs. Similarly, the secondary winding SW2 displaced from the winding SW1, representing the sine function output, by an amount of "p/4" provides an output representing a cosine function (denoted by "c" in the figure), and the secondary winding SW4 displaced from the winding SW1 by an amount of "p/2" provides an output representing a minus cosine function /c (the mark "/" in the text corresponds to the upper short bar in the figure); in this case, a second A.C. output signal having a cosine amplitude function is provided by differentially synthesizing the two outputs.

Figure 2:
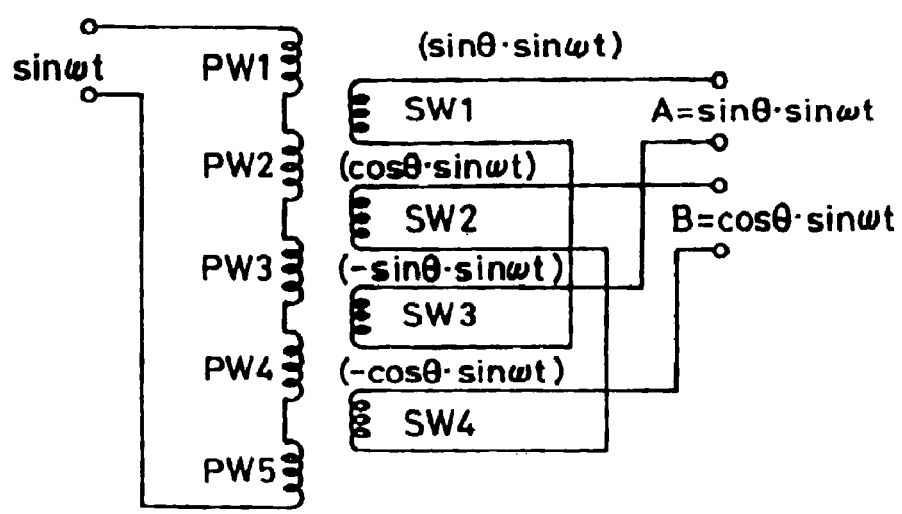
FIG. 2 is a schematic circuit diagram showing a structural example of a winding section of FIG. 1.

FIG. 2 is a schematic circuit diagram of the winding section 10, in which a common exciting A.C. signal (denoted by "sin ωt", for convenience of illustration) is applied to the primary windings PW1 to PW5. In response to excitation of the primary windings PW1 to PW5, A.C. signals having amplitude values corresponding to locations of the magnetic response members 22 relative to the winding section 10 are induced in the individual secondary windings SW1 to SW4. The induced voltage levels represent two-phase function characteristics of sin θ and cos θ and two opposite-phase function characteristics of −sin θ and −cos θ, in correspondence with a current linear position of the object of detection x. That is, the inductive output signals of the individual secondary windings SW1 to SW4 are amplitude-modulated by the two-phase function characteristics of sin θ and cos θ and two opposite-phase function characteristics of −sin θ and −cos θ in correspondence with a current linear position of the object of detection. Note that "θ" is proportional to "x", and, for example, θ=2π (x/p). For convenience of explanation, coefficients, such as the respective numbers of turns of the windings, depending on other conditions are not considered here. Also, the secondary winding SW1 is shown and described as a sine phase with its output signal represented as "sin θ·sin ωt"; the secondary winding SW2 is shown and described as a cosine phase with its output signal represented as "cos θ·sin ωt"; the secondary winding SW3 is shown and described as a minus sine phase with its output signal represented as "−sin θ·sin ωt"; and the secondary winding SW4 is shown and described as a minus cosine phase with its output signal represented as "−cos θ·sin ωt".

By differentially synthesizing the inductive outputs of the sine and minus sine phases, there will be obtained the first A.C. output signal (2 sin θ·sin ωt) having a sine amplitude function. Similarly, by differentially synthesizing the inductive outputs of the cosine and minus cosine phases, there will be obtained the second A.C. output signal (2 cos θ·sin ωt) having a cosine amplitude function. Hereinafter, the coefficient "2" will be omitted for simplicity of illustration, so that the first A.C. output signal will be indicated as "sin θ·sin ωt" and the second A.C. output signal will be indicated as "cos θ·sin ωt".

In the above-mentioned manner, there are provided the first A.C. output signal A (=sin θ·sin ωt) having, as its amplitude value, a first function value sin θ corresponding to the linear position of the object of detection x and the second A.C. output signa B (=cos θ·sin ωt) having, as its amplitude value, a second function value cos θ corresponding to the same linear position of the object of detection x. It will be seen that with such winding arrangements, the linear position detector is capable of providing two A.C. output signals having two-phase amplitude functions (sine and cosine outputs) just like those provided by the conventional rotary-type position detector devices commonly known as resolvers. As a result, the two-phase A.C. output signals (A=sin θ·sin ωt and B=cos θ·sin ωt) can be utilized in a similar manner to the outputs from the conventionally known resolvers.

A position detector applicable to a phase difference detection device according to the present invention is not limited to the position detector device as shown in FIG. 1. The position detector applicable to a phase difference detection device according to the present invention may be a position sensor of any desired type having a single-phase exciting input and two-phase outputs. For example, the position detector may be a conventionally known resolver of the brushless or brush-equipped type. Alternatively, the position detector may be a variable-reluctance type position sensor such as a "Microsyn" (trade name) where primary and secondary windings are provided on the stator with no winding on the rotor or movable member, or it may be either a rotational position sensor or linear position detecting sensor. The position detector applicable to the phase diference detection device according to the present invention may be constructed in such a manner that the winding section has only a primary wninding or windings and an output signal or signals is generated from the primary winding or windings in response to an impedance or inductance variation of the primary winding or windings.

Figure 3:
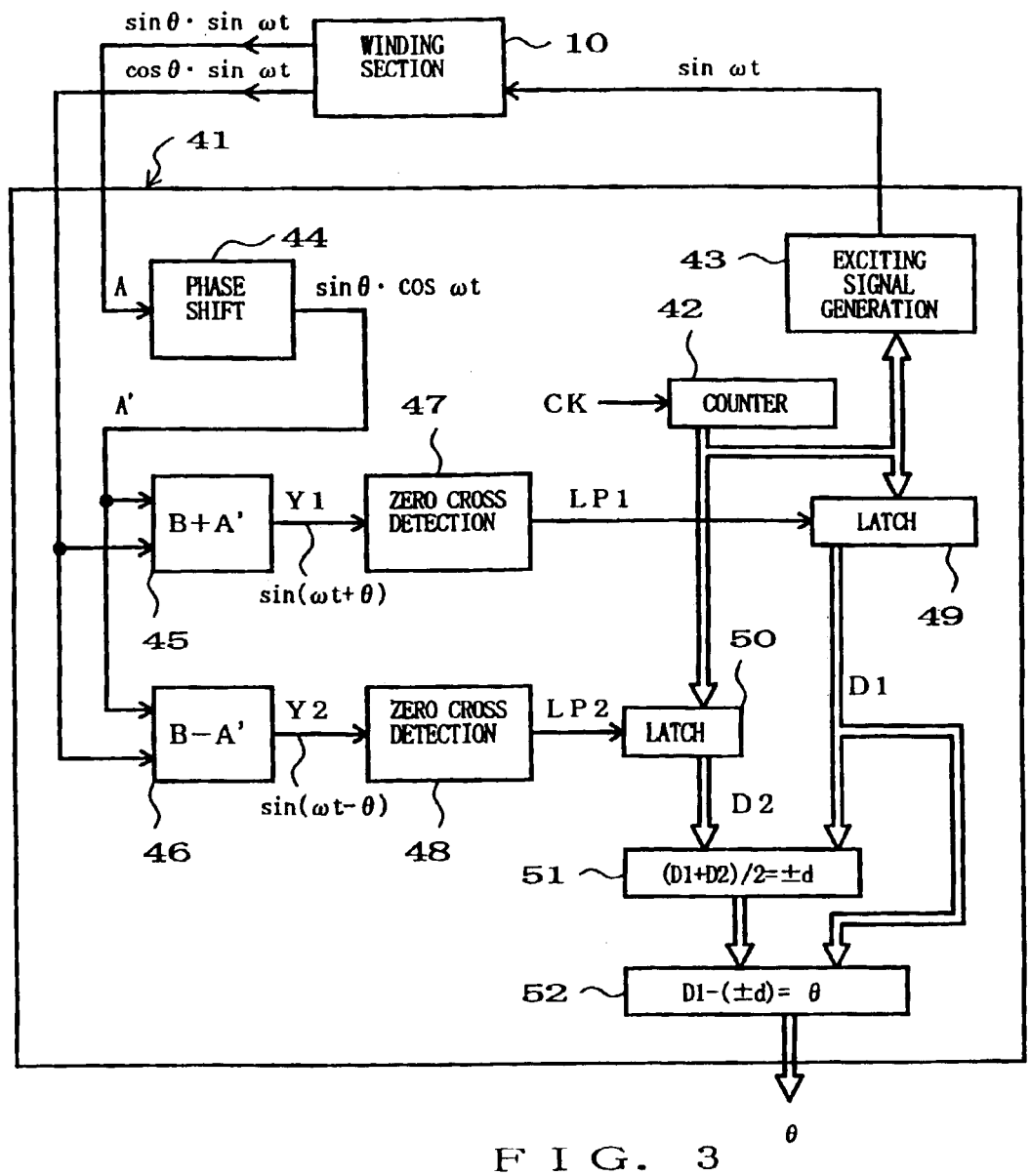
FIG. 3 is a block diagram showing an embodiment of the phase difference detection device according to the present invention.

FIG. 3 shows an embodiment of the phase difference detection device according to the present invention. A single-phase exciting A.C. signal (denoted by "sin ωt" for convenience of description) generated in a detection circuit section 11 is applied to the winding section 10 so as to excite the primary winding. In the winding section 10, A.C. output signals are induced in the two-phase secondary windings in response to excitation of the primary winding W1, and the respective induced voltage levels of the signals present two-phase functional characteristics, sin θ and cos θ, corresponding to a particular position to be detected (position-to-be-detected) x. That is, the induced output signals of the secondary windings are output, with their amplitudes modulated by the two-phase functional characteristics sin θ and cos θ corresponding to the position-to-be-detected x. For convenience of description, coefficients relating to other conditions such as the respective turns of the windings will not be taken into account, and the secondary winding is assumed to be of sine phase with its output signal represented by "sin θ·sin ωt" whereas the other secondary winding is assumed to be of cosine phase with its output signal represented by "cos θ·sin ωt". That is, the secondary winding outputs a first A.C. output signal A (=sin θ·sin ωt) having as its amplitude value a first function value sin θ corresponding to the position-to-be-detected x, and the secondary winding outputs a second A.C. output signal B (=cos θ·sin ωt) having as its amplitude value a second function value cos θ corresponding to the position-to-be-detected x.

In the detection circuit section 41 shown in FIG. 3, counter 42 counts predetermined high-speed clock pulses CK, exciting signal generation circuit 43 generates an exciting A.C. signal (e.g., sin ωt) on the basis of a counted value of the counter 42, and the generated A.C. signal is supplied to the primary winding W1 of the winding section 10. The modulus of the counter 42 corresponds to one cycle of the exciting A.C. signal, and it is assumed herein, for convenience of description, that its counted value "0" corresponds to the zero phase of reference sine signal sin ωt. During one complete cycle of the reference sine signal sin ωt from the zero to maximum phases is generated during one cycle of counting of the counter 42 from zero to the maximum value, one complete cycle of the exciting A.C. signal sin ωt is generated, by the exciting signal generation circuit 43.

The first and second A.C. output signals A and B of the winding section 10 are supplied to the detection circuit section 41. In the detection circuit section 41, the first A.C. output signal A (=sin θ·sin ωt) is input to a phase shift circuit 44 so that it is shifted in electric phase by a predetermined amount (e.g., 90°) so as to provide a phase-shifted A.C. signal A' (=sin θ·cos ωt). The detection circuit section 41 also includes adder and subtracter circuits 45 and 46. In the adder circuit 45, the phase-shifted A.C. signal A' (=sin θ·cos ωt) from the phase shift circuit 44 and the above-mentioned second A.C. output signal B (=cos θ·sin ωt) are added together so as to obtain, as an added output signal, a first electric A.C. signal Y1 that may be expressed by a brief formula of B+A'=cos θ·sin ωt+sin θ·cos ωt=sin(ωt+θ). On the other hand, in the subtracter circuit 46, a subtraction between the phase-shifted A.C. signal A' (=sin θ·cos ωt) from the phase shift circuit 44 and the above-mentioned second A.C. output signal B (=cos θ·sin ωt) is performed so as to obtain, as a subtracted output signal, a second electric A.C. signal Y2 that may be expressed by a brief formula of B−A'=cos θ·sin ωt−sin θ·cos ωt=sin(ωt−θ). In this way, there can be obtained, through electric processing, the first electric A.C. signal Y1 (=sin(ωt+θ)) having an electric phase (+θ) shifted in the positive direction in correspondence to the position-to-be-detected x, and the second electric A.C. signal Y2 (=sin(ωθt−θ)) having an electric phase (−θ) shifted in the negative direction in correspondence to the position-to-be-detected x.

The above-mentioned output signals Y1 and Y2 of the adder and subtracter circuits 45 and 46 are given to zero-cross detection circuits 47 and 48 for detection of the respective zero-cross points of the signals Y1 and Y2. The zero-cross detection is done by, for example, identifying a point where the signal Y1 or Y2 changes from a negative value to a positive value, i.e., a zero phase point. Zero-cross detection pulses generated by the circuits 47 and 48 upon detection of the respective zero-cross points are applied as latch pulses LP1 and LP2 to corresponding latch circuits 49 and 50. Each of the latch circuits 49 and 50 latches a counted value of the counter 42 at the timing of the corresponding latch pulse LP1 or LP2. Since, as noted earlier, the modulus of the counter 42 corresponds to one cycle of the exciting A.C. signal and its counted value "0" corresponds to a zero phase of the reference sine signal sin ωt, data D1 and D2 thus latched in the latch circuits 49 and 50 correspond to phase differences of the output signals Y1 and Y2 with respect to the reference sine signal sin ωt. Output data from the latch circuits 49 and 50 are supplied to an error calculation circuit 51, which in turn conducts a computation of "(D1+D2)/2". This computation may in practice be conducted by right (downward)-shifting by one bit the sum of the binary data "D1+D2".

If the phase variation error is represented by "±d" considering possible influence of ununiform lengths of wiring cables between the winding section 10 and detection circuit section 41 and impedance change caused by the temperature change in the windings of the winding section 10, the above-mentioned signals handled in the detection circuit section 41 may be expressed as follows:

$A = \sin\theta \cdot \sin(\omega t \pm d);$ $A' = \sin\theta \cdot \cos(\omega t \pm d);$ $B = \cos\theta \cdot \sin(\omega t \pm d);$ $Y1 = \sin(\omega t \pm d + \theta);$ $Y2 = \sin(\omega t \pm d - \theta);$ $D1 = \pm d + \theta;$ and $D2 = \pm d - \theta$ Namely, since the phase difference counting is performed using the reference sine signal sin ωt as a reference phase, the phase difference measurement data D1 and D2 will contain the phase variation error "±d" as previously mentioned. The phase variation error "±d" can be calculated by the error calculation circuit 51 using the following expression:

$$(D1+D2)/2 = \{(\pm d + \theta) + (\pm d - \theta)\}/2$$
$$= \pm 2d/2 = \pm d$$

Data indicative of the phase variation error "±d" calculated by the error calculation circuit 51 is delivered to a subtracter circuit 52, where the data "±d" is subtracted from one (D1) of the phase difference measurement data D1 and D2. That is, because the subtracter circuit 52 carries out a subtraction of "D1−(±d)", $D1-(\pm d) = \pm d + \theta - (\pm d) = \theta,$ and thus there can be obtained digital data indicative of an accurate phase difference θ from which the phase variation error "±d" has been removed. From the foregoing, it will be readily understood that the present invention allows only the accurate phase difference θ corresponding to the position-to-be-detected x to be extracted by cancelling out the phase fluctuation error "±d".

This feature will be described in greater detail with reference to FIGS. 4A and 4B, which show waveforms, at and around a zero phase point, of the sine signal sin ωt used as the phase measuring reference and the first and second A.C. signals Y1 and Y2; FIG. 4A shows such waveforms in the case where the phase variation error is positive, whereas FIG. 4B shows such waveforms in the case where the phase variation error is negative. In the-case shown in FIG. 4A, the zero phase of the first signal Y1 is displaced or shifted, by "θ+d", ahead of that of the reference sine signal sin ωt, and phase difference detection data D1 corresponding thereto represents a phase difference equivalent to "θ+d". Further, the zero phase of the second signal Y2 is displaced or shifted, by "−θ+d", behind that of the reference sine signal sin ωt, and phase difference detection data D2 corresponding thereto represents a phase difference equivalent to "−θ+d". In this case, the error calculation circuit 51 calculates a phase variation error "+d" on the basis of $$(D1+D2)/2 = \{(+d+\theta) + (+d-\theta)\}/2$$
$$= +2d/2 = +d$$

Then, the subtracter circuit 52 carries out a calculation of $D1-(+d) = +d+\theta-(+d) = \theta,$ to thereby extract an accurate phase difference θ.

On the other hand, in the case shown in FIG. 4B, the zero phase of the first signal Y1 leads, by "θ−d", that of the reference sine signal sin ωt, and phase difference detection data D1 corresponding thereto represents a phase difference equivalent to "θ−d". Further, the zero phase of the second signal Y2 lags, by "−θ−d", that of the reference sine signal sin ωt, and phase difference detection data D2 corresponding thereto represents a phase difference equivalent to "−θ−d". In this case, the error calculation circuit 51 calculates a phase fluctuation error "+d" on the basis of $$(D1+D2)/2 = \{(-d+\theta) + (-d-\theta)\}/2$$
$$= -2d/2 = -d$$

Then, the subtracter circuit 52 carries out a calculation of $D1-(-d) = -d+\theta-(-d) = \theta,$ to thereby extract an accurate phase difference θ.

Alternatively, the subtracter circuit 52 may carry out a subtraction of "D2−(±d)", and by so doing, there can be obtained data (−θ) which in principle reflects an accurate phase difference θ in a similar manner to the above-mentioned.

As seen from FIGS. 4A and 4B as well, the electric phase difference between the first and second signals Y1 and Y2 is 2θ, which always represents the double of the accurate phase difference θ where the phase variation errors "±d" in the two signals Y1 and Y2 have been cancelled out. Therefore, the structure of the circuitry including the latch circuits 49 and 50, error calculation circuit 51, subtracter circuit 52 etc. may be modified, if necessary, in such a manner to directly obtain the electric phase difference 2θ between the first and second signals Y1 and Y2. For example, digital data corresponding to the electric phase difference 2θ where the phase variation errors "±d" in the two signals Y1 and Y2 have been cancelled out may be obtained by using a suitable means to gate a period between generation of the pulse LP1 corresponding to a zero phase of the first signal Y1 output from the zero-cross detection circuit 47 and generation of the pulse LP2 corresponding to a zero phase of the second signal Y2 output from the zero-cross detection circuit 48, and counting the gated period. Then, data corresponding to θ can be obtained by downward-shifting the digital data by one bit.

The latch circuit 49 for latching "+θ" and latch circuit 50 for latching "−θ" in the above-mentioned embodiment have just been described as latching a count output of the same counter 42, and no specific reference has been made to the sign (positive or negative sign) of the latched data. However, the sign of the data may be selected as desired by applying an appropriate design choice along the spirit of the present invention. If, for example, the modulus of the counter 42 is 4,096 (in decimal notation), it will suffice to perform necessary arithmetic by relating its possible digital counts 0to 4,095 to phase angles 0 to 360°. In the simplest example, the necessary arithmetic may be performed by using the uppermost bit of a counted output of the counter 42 as a sign bit and relating digital counts 0 to 2,047 to +0 to +180° and digital counts 2,048 to 4,095 to −180 to −0°. In another example, digital counts 4,095 to 0 may be related to negative angle data −360 to −0° by the input or output data of the latch circuit 50 into 2's complements.

Incidentally, no particular problem arises when the position-to-be-detected x is in a stationary state; however, as the position x varies timewise, the corresponding phase angle θ also time-varies. In such a case, the phase difference value θ between the respective output signals Y1 and Y2 of the adder and subtracter circuits 45 and 46, rather than assuming a fixed value, presents dynamic characteristics time-varying in correspondence with the moving speed. If this is represented by θ(t), then the respective output signals Y1 and Y2 may be expressed by $Y1 = \sin\{\omega t \pm d + \theta(t)\}$ $Y2 = \sin\{\omega t \pm d - \theta(t)\}$ Namely, the phase-leading output signal Y1 shifts in frequency, with respect to the frequency of the reference signal sin ωt, in a direction where the frequency increases in accordance with the "+θ(t)", whereas the phase-lagging output signal Y2 shifts in frequency, with respect to the frequency of the reference signal sin ωt, in a direction where the frequency decreases in accordance with the "−θ(t)". Because, under such dynamic characteristics, the respective periods of the signals Y1 and Y2 successively shift in the opposite directions for each cycle of the reference signal sin ωt, the measured time references of the latched data D1 and D2 in the latch circuits 49 and 50 will differ from each other, so that the accurate phase variation errors "±d" can not be obtained by mere operations of the circuits 51 and 52.

A simplest possible way to avoid such a problem is to limit the function of the device of FIG. 3 in such a manner that the device ignores outputs obtained when the position-to-be-detected x is moving timewise and instead measures the position x in a stationary state by use of only outputs obtained in the stationary state. Thus, the present invention may be embodied for such a limited purpose.

But, it will be desirable to be able to accurately detect every phase difference θ corresponding to a varying position-to-be-detected x even during the time-variation of the object. Therefore, a description will be made below, with reference to FIG. 5, about an improvement of the present invention which, in order to address the above-mentioned problem, is capable of detecting every phase difference θ corresponding to a varying position x even during the time-variation of the position x.

FIG. 5 extractively shows a modification of the error calculation and subtracter circuits 51 and 52 in the detection circuit section 41 of FIG. 3, and the other components not shown in the figure may be the same as in FIG. 3. If phase difference θ corresponding to the time-varying position-to-be-detected x is represented by +θ(t) and −θ(t), the output signals Y1 and Y2 can be expressed as the above-mentioned. Then, the phase difference measurement data D1 and D2 obtained by the latch circuits 49 and 50 are $D1 = \pm d + \theta(t)$ $D2 = \pm d - \theta(t)$ In this case, "±d+θ(t)" will repeatedly time-vary in the positive direction over a range from θ to 360° in response to the time-variation of the phase difference θ, whereas "±d−θ(t)" will repeatedly time-vary in the negative direction over a range from 360 to 0° in response to the time-variation of the phase difference θ. Thus, although ±d+θ(t)≠±d−θ(t) results sometimes, the variations of the two data intersect each other some other time, and thereby ±d+θ(t)=±d−θ(t) is established. When ±d+θ(t)=±d−θ(t), the output signals Y1 and Y2 are in phase and the latch pulses LP1 and LP2 corresponding to the respective zero-cross detection timing of the signals Y1 and Y2 are generated at the same timing.

In FIG. 5, a coincidence detection circuit 53 detects a coincidence in the generation timing of the latch pulses LP1 and LP2 corresponding to the respective zero-cross detection timing of the output signals Y1 and Y2, and generates a coincidence detection pulse EQP upon detection of such a coincidence. A time-variation determination circuit 54 determines, via an optional means (e.g., means for detecting presence or absence of time-variation in the value of one of the phase difference measurement data D1), that the position-to-be-detected x is in the time-varying mode, and it outputs a time-varying mode signal TM upon such a detection.

Selector 55 is provided between the error calculation and subtracter circuits 51 and 52 so that when no time-varying mode signal TM is generated (TM="0"), i.e., when the position-to-be-detected x is not time-varying, the output signal applied from the error calculation circuit 51 to selector input B is selected to be fed to the subtracter circuit 52. When the input B of the selector 55 is selected, the circuitry of FIG. 5 operates in a manner equivalent to the circuitry of FIG. 15; that is, when the position-to-be-detected x is at rest, i.e, not moving, the output data of the calculation circuit 51 is fed directly to the subtracter circuit 52 via the input B so that the circuitry operates as in FIG. 3.

In contrast, when the time-varying mode signal TM is generated (TM="1"), i.e., when the position-to-be-detected x is time-varying, the output signal applied from the latch circuit 56 to selector input A is selected to be fed to the subtracter circuit 52. Then, once the coincidence detection pulse EQP is generated while the mode signal is "1", an AND condition is satisfied in AND gate 57, which thus outputs a pulse responsive to the coincidence detection pulse EQP. The output pulse of the AND gate 57 is given as a latch command to the latch circuit 56, which latches output count data of the counter 42 in response to the latch command. Because, when the coincidence detection pulse EQP is generated, the output of the counter 42 will be latched concurrently in both the latch circuits 49 and 50, D1=D2 is met, and hence the data latched in the latch data 56 is equivalent to D1 or D2 (provided that D1=D2).

Further, because the coincidence detection pulse EQP is generated once the respective zero-cross detection timing of the output signals Y1 and Y2 coincides, i.e., once "±d+θ(t)=±d−θ(t)" is met, the data latched in the latch data 56 in response to the pulse EQP is equivalent to D1 or D2 (provided that D1=D2) and therefore equivalent to $(D1+D2)/2$ This means $$(D1 + D2)/2 = [\{\pm d + \theta(t)\} + \{(\pm d - \theta(t)\}]/2$$
$$= 2(\pm d)/2 = \pm d$$

and hence further means that the data latched in the latch data 56 is an accurate indication of the phase variation error "±d".

Thus, when the position-to-be-detected x is time-varying, data accurately indicating the phase variation error "±d" is latched in the latch circuit 56 in response to the coincidence detection pulse EQP, and the output data of this latch circuit 56 is sent via the input A to the subtracter circuit 52. Accordingly, the subtracter circuit 52 can obtain only the data $\theta(\theta(t)$ in the case where the position x is time-varying) which accurately corresponds only to the position x and from which the phase variation error "±d" has been eliminated.

In the modified example of FIG. 5, the AND gate 57 may be omitted so that the coincidence detection pulse EQP is applied directly to the latch control input of the latch circuit 56.

Further, as denoted by a broken-line arrow, the latch circuit 56 may latch the output data "±d" of the error calculation circuit 51 rather than the output count data of the counter 42. In such a case, the output timing from the calculation circuit 51 of the output data is slightly delayed behind the generation timing of the coincidence detection pulse EQP due to operational delays of the latch circuits 49 and 50 and calculation circuit 51, so it is preferable that the output of the calculation circuit 51 be latched into the latch circuit 56 after having undergone appropriate adjustment against the time delay.

It should also be readily understood that in the case where the detection circuit section 41 is constructed taking only dynamic characteristics into account, it is possible to omit the circuit 51 and selector 55 of FIG. 5 and one of the latch circuits 49 or 50 of FIG. 3.

FIG. 6 shows another embodiment of the phase difference detecting operation directed to cancelling phase variation error "±d".

First and second A.C. output signals A and B which are outputted from the secondary winding SW1–SW4 of the winding section 10 are introduced into a detection circuit section 60. In a same manner as shown in FIG. 3, the first A.C. output signal A (=sin θ·sin ωt) is input to a phase shift circuit 44 of the section 60, where its electric phase is shifted by a predetermined amount to provide a phase-shifted A.C. signal A' (=sin θ·cos ωt). In a subtracter circuit 46, a subtraction between the phase-shifted A.C. signal A' (=sin θ·cos ωt) and the second A.C. output signal B (=cos θ·sin ωt) is performed to provide an A.C. signal Y2 that may be expressed by a brief formula of B−A'=cos θ·sin ωt−sin θ·cos ωt=sin(ωt−θ). The output signal Y2 of the subtracter circuit 46 is fed to a zero-cross detection circuit 48 so that a latch pulse LP2 is output upon detection of a zero-cross point and supplied to a latch circuit 50.

The embodiment of FIG. 6 is different from that of FIG. 3 in terms of a reference phase that is used to measure a phase difference amount θ from an A.C. signal Y2 (=sin(ωt−θ)) containing the phase difference corresponding to the position-to-be-detected x. More specifically, in the embodiment of FIG. 3, the reference phase used to measure the phase difference amount θ is the zero phase of the reference sine signal sin ωt which is not input to the winding section 10 and hence does not contain phase variation error "±d" caused by various factors such as variation of wiring impedance due to temperature change etc. Because of this, the embodiment of FIG. 3 forms two A.C. signals, Y1 (=sin(ωt+θ)) and Y2 (=sin(ωt−θ)) and cancels out the phase variation error "±d" by calculating a phase difference between the two signals. In contrast, the embodiment of FIG. 6 is designed to eliminate the phase variation error "±d" by, on the basis of the first and second output signals A and B output from the winding section 10, forming the reference phase to be used for measuring the phase difference amount θ in such a manner that the reference phase itself contains the error "±d".

More specifically, in the detection circuit section 60 of FIG. 6, the first and second output signals A and B output from the winding section 10 are input to zero-cross detection circuits 61 and 62, respectively, each of which detects a zero-cross of the corresponding input signal. It is assumed herein that each of the detection circuits 61 and 62 outputs a zero-cross detection pulse in response to both a positive-going zero-cross point where the amplitude of the corresponding input signal A or B changes from a negative value to a positive value (so to speak, 0° phase) and a negative-going zero-cross point where the amplitude of the corresponding input signal A or B changes from a positive value to a negative value (so to speak, 180° phase). The reason is that, because sin θ and cos θ determining the positive or negative polarity of the amplitude of each signal A and B become positive or negative in response to the value of θ, it is at least necessary to detect a zero-cross for every 180° in order to detect zero-cross points for every 360° on the basis of combination of the two signals. The zero-cross detection pulses output from the two zero-cross detection circuits 61 and 62 are ORed by an OR circuit 63, and the resultant output of the OR circuit 63 is fed to a suitable ½ frequency divider/pulse circuit 64 (which may include for example a ½ frequency divider circuit such as a T flip-flop and a pulse outputting AND gate) in such a manner that every other zero-cross detection pulse is taken out, so that the zero-cross for every 360°, i.e, zero-cross detection pulse corresponding only to the zero phase is output as a reference phase signal pulse RP. This pulse RP is applied to the reset input of a counter 65 which continually counts predetermined clock pulses CK. The counter 65 is reset to "0" whenever the reference phase signal pulse RP is applied thereto. The counted value of the counter 65 is fed to the latch circuit 50, where it is latched at the generation timing of the latch pulse LP2. Then, the data D thus latched in the latch circuit 50 is output as measurement data of the phase difference θ corresponding to the position-to-be-detected x.

The first and second A.C. output signals A and B from the winding section 10 are expressed by A=sin θ·sin ωt and B=cos θ·sin ωt, respectively, and are in phase with each other. Respective zero-cross points should therefore be detected at the same timing; actually, however, the amplitude level of either of the signals may become "0" or close to "0" since the amplitude coefficients vary in sin θ and cos θ, in which case it is practically impossible to detect any zero-cross point of one of the signals. Thus, this embodiment is characterized in that zero-cross detection processing is performed on each of the two A.C. output signals A (=sin θ·sin ωt) and B (=cos θ·sin ωt), and the zero-cross detection outputs of the two signals are ORed so that even when no zero-cross of either of the signal can be detected because of a small amplitude level, it is possible to utilize the zero-cross detection output signal of the other signal having a relatively great amplitude level.

In the FIG. 6 embodiment, if the phase variation caused by variation in wiring impedance of the winding section 10 etc. is for example "−d", the A.C. signal Y2 output from the subtracter circuit 46 will be sin(ωt−d−θ) as shown in FIG. 7A. In this case, the output signals A and B of the winding section 10 assume respective amplitude values sin θ and cos θ corresponding to the angle θ and contain respective phase variation errors as represented by A=sin θ·sin(ωt−d) and B=cos θ·sin(ωt−d), as shown in FIG. 7B. Consequently, the reference phase signal RP obtained at such timing as shown in FIG. 7C on the basis of the zero-cross detection is displaced, by the variation error "−d", from a zero phase of the normal reference reference sine signal sin ωt. Thus, an accurate angle value θ free of the variation error "−d" will be obtained by measuring a phase difference amount in the output A.C. signal Y2 (=sin(ωt−d−θ)) of the subtracter circuit 46.

Note that after various conditions, such as the wiring length of the winding section 10, have been set, the impedance variation depends primarily on the temperature. Then, the above-mentioned phase variation error ±d corresponds to data indicative of a temperature in an environment where the linear position detector device is installed. Thus, the device including the circuit 51 for calculating a phase variation error ±d as in the embodiment of FIG. 3 can provide the calculated phase variation error ±d as temperature detection data if necessary. As a result, the arrangements of the present invention affords the superior benefit that it can not only detect a current position of the object of detection but also provide data indicative of an environmental temperature, using only one position detector, thus achieving a multipurpose sensor that has not existed so far. Of course, the present inventive arrangements permit a high-precision position detection accurately responding to the object of detection, without being significantly influenced by the sensor impedance variations due to temperature changes and the lengths of wiring cables. Further, because the examples of FIGS. 3 and 6 are based on measurement of a phase difference in A.C. signals, they can provide a detection with higher responsiveness than that provided by the technique of the prior art.

Figure 8A:
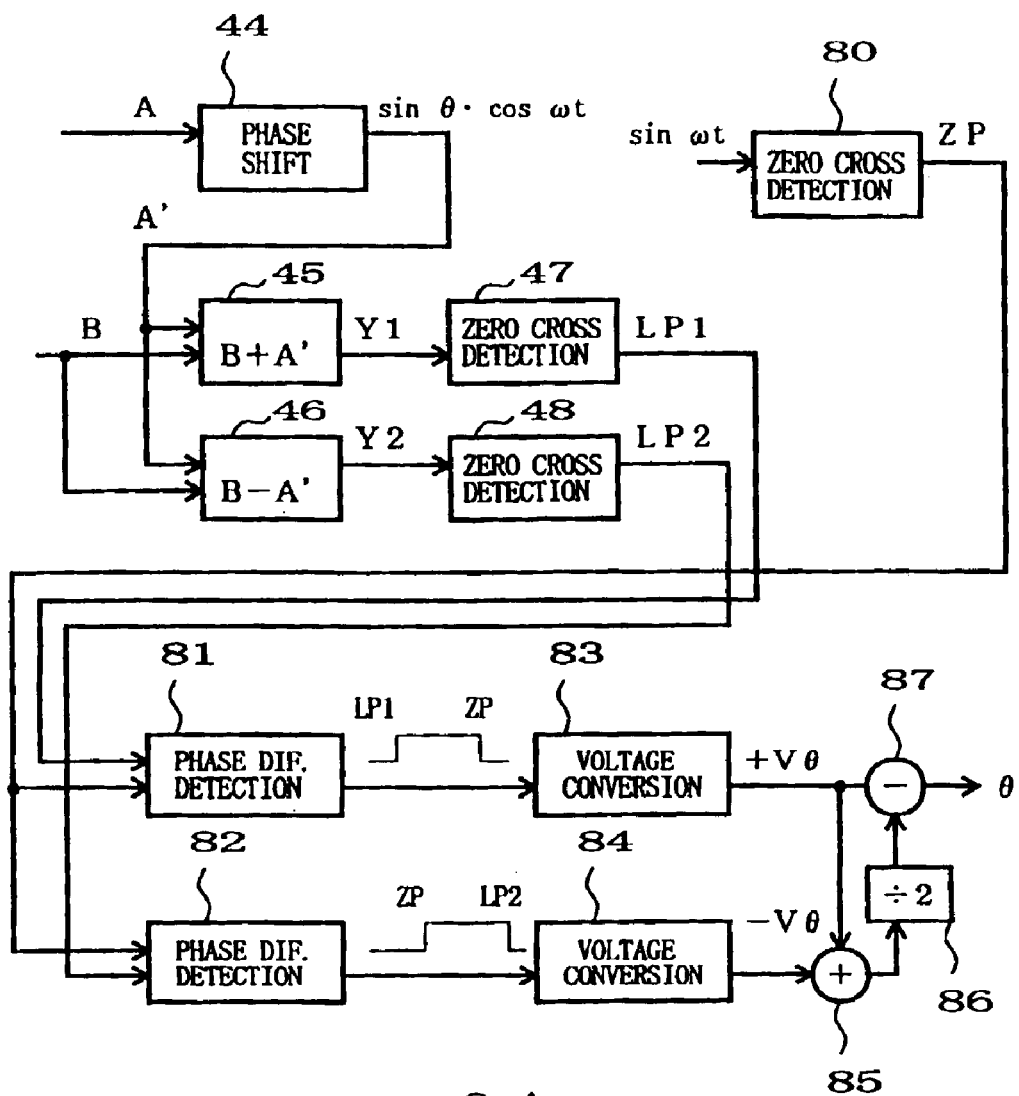
FIGS. 8A and 8B are block diagrams showing still another embodiment of the phase difference detection device according to the present invention, where analog position detection data is obtained through analog arithmetic operations.

Whereas the phase data D1 and D2 of the output signals Y1 and Y2, in the foregoing example, have been described as being subjected to digital operations so that the position detection data θ is output in digital representation, the position detection data θ may alternatively be output in analog representation. To this end, it is only necessary that the calculated position detection data θ undergo D/A (digital-to-analog) conversion. As another example, analog operations may be carried out, by circuitry as illustrated in FIG. 8A, to directly obtain the position detection data θ in analog representation. In the circuitry of FIG. 8A, a zero-cross detecting circuit 80 detects each zero-cross point (i.e., zero degree phase) in the exciting primary A.C. signal sin ωt, so as to generate a zero-cross detection pulse ZP. A phase difference detecting circuit 81 outputs a gate pulse having a time width that corresponds to a generation timing difference +θ between a zero-cross detection pulse (latch pulse) LP1 of the output signal Y1 (=sin(ωt+θ)) and the zero-cross detection pulse ZP (more particularly, plus θ±d). This gate pulse is then given to a voltage converting circuit 83, which in turn outputs an integrated voltage +Vθ corresponding to the pulse time width (i.e., an analog voltage corresponding to the phase amount+θ±d).

Another phase difference detecting circuit 82 outputs a gate pulse having a time width that corresponds to a generation timing difference −θ between the zero-cross detection pulse ZP and a zero-cross detection pulse (latch pulse) LP2 of the output signal Y2 (=sin(ωt−θ)) (more particularly, minus θ±d ). This gate pulse is then given to a voltage converting circuit 84, which in turn outputs an integrated voltage −Vθ corresponding to the pulse time width (i.e., an analog voltage corresponding to the phase amount−θ±d). These voltages +Vθ and −Vθ are added together by an adder 85, the resultant sum is divided by two via a divider 86, and then the quotient from the divider 86 is subtracted from the integrated voltage +Vθ. In this manner, these analog operators execute arithmetic operations similar to those provided by the operators 49 to 52 of FIG. 3, and consequently they can yield analog position detection data θ.

Figure 8B:
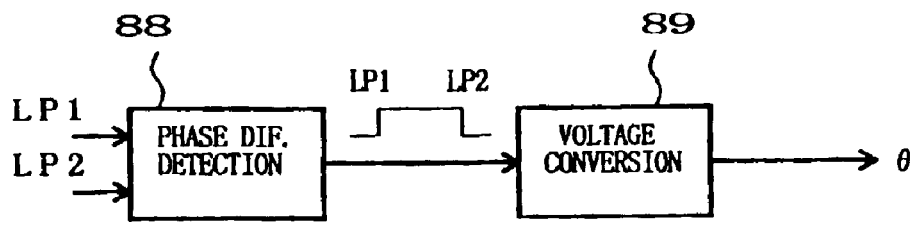

The circuitry illustrated in FIG. 8A may be simplified in a manner as shown in FIG. 8B, in which a phase difference detecting circuit 88 outputs a gate pulse having a time width that corresponds to a generation timing difference 2θ between the zero-cross detection pulse (latch pulse) LP1 of the output signal Y1 (=sin(ωt+θ)) and the zero-cross detection pulse (latch pulse) LP2 of the output signal Y2 (=sin(ωt−θ)). This gate pulse is then given to a voltage converting circuit 89, which in turn outputs an integrated voltage corresponding to the pulse time width (i.e., an analog voltage corresponding to the phase amount 2θ). The thus-determined analog voltage, which is a voltage having removed therefrom an error ±d caused by temperature change etc., corresponds to (or is proportional to) θ and therefore can be utilized directly as position detection data θ.

Figure 9:
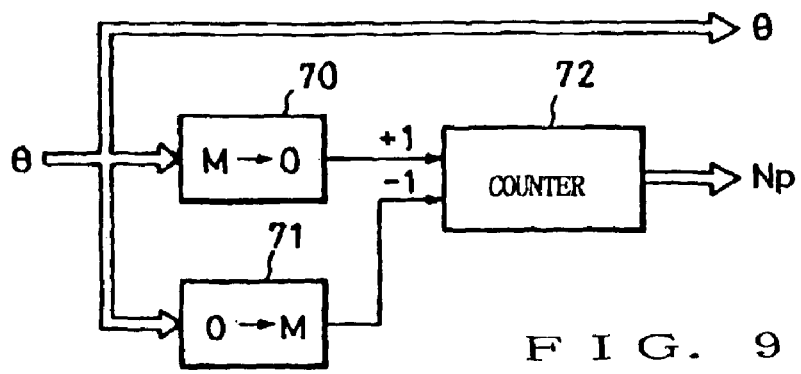
FIG. 9 is a block diagram showing an example of a circuit for measuring and counting pitch-by-pitch displacement of magnetic response members in the linear position detector device which is applicable to a phase difference detection device according to the present invention.

The above-described various embodiments are capable of detecting, in an absolute value, a linear position x within a range of one pitch length p between the magnetic response members 22. Absolute values of linear positions x beyond the pitch length p can be detected by an appropriate counter incrementally or decrementally counting the number of occurring pitch lengths each time the object of detection moves beyond one of the pitch lengths p. This counting may be effected by incrementing or decrementing the counted value of the counter by one depending on the direction of movement of the magnetic response members 22, each time the output signal of the winding section 10 makes a round through the one-pitch-length range. For example, circuitry as shown in FIG. 9 may be provided in such a manner that determining circuits 70 and 71 determine when the digital measurement value based on the output signal of the winding section 10 changes from its maximum to minimum (M→0) or from its minimum to maximum (0→M), so as to generate a count trigger signal of a value "+1" or "−1" to be counted by a counter 72. In this case, the count Np of the counter 72 can be used as higher-order data of a position detection value.

Figure 10A:
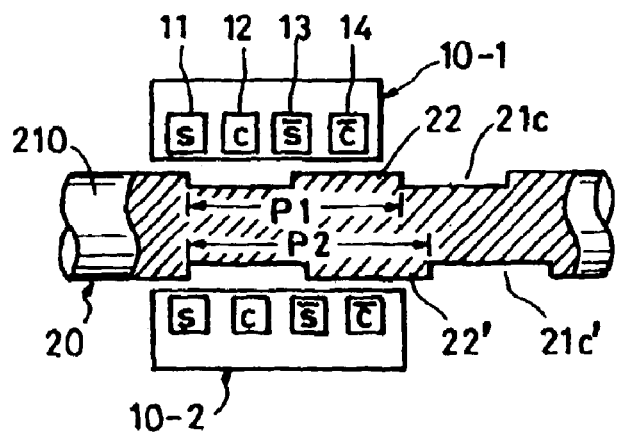
FIGS. 10A and 10B are schematic axial and radial sectional views showing an example where positions over a long range beyond one pitch length of the magnetic response members are detected in absolute values in the linear position detector device which is applicable to a phase difference detection device according to the present invention.
Figure 10B:
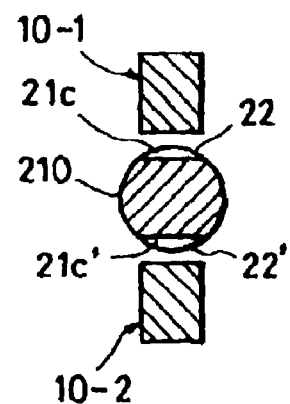

Alternatively, two detecting sections differing from each other in one pitch length p may be provided on both sides of a single rod 210, as shown in FIGS. 10A and 10B, so that absolute values of linear positions x beyond the pitch length p are detected on the basis of the vernier principle. FIG. 10A is an axial sectional view of the rod 210 taken along the axis thereof, while FIG. 10B is a radial sectional view of the rod 210 taken across the diameter thereof. The first detecting section functioning as a main measure has a plurality of recessed portions 21*c* (or 21*d*) formed therein in a repeated fashion along the length of a magnetic rod 210, so that a plurality of raised positions are formed as magnetic response members 22 repeated at a predetermined pitch P1, thereby resulting in an alternating repetition of the recessed and raised portions 21*c* (or 21*d*) and 22. The winding section 10-1 corresponding to the first detecting section includes four poles 11 to 14 corresponding to the sine phase (s), cosine phase (c), minus sine phase (/s) and minus cosine phase (/c), respectively. Similarly, the second detecting section functioning as a secondary measure has a plurality of recessed portions 21c' formed therein in a repeated fashion along the length of a magnetic rod 210, so that a plurality of raised positions are formed as magnetic response members 22' in repetition at a predetermined pitch P2, thereby resulting in an alternating repetition of the recessed and raised portions 21c' and 22'. The winding section 10-2 corresponding to the second detecting section includes four poles 11 to 14 corresponding to the sine phase (s), cosine phase (c), minus sine phase (/s) and minus cosine phase (/c), respectively. The pitches P1 and P2 in the first and second detecting sections differ from each other by an appropriate amount. By arithmetically processing position detection data $\theta 1$ and $\theta 2$ from the first and second detecting sections, absolute position detection values can be obtained within a range of the least common multiple of the pitch lengths P1 and P2. In this case, the rod 210 is of course properly guided to just linearly move without being accidentally rotated at all.

Figure 11A:
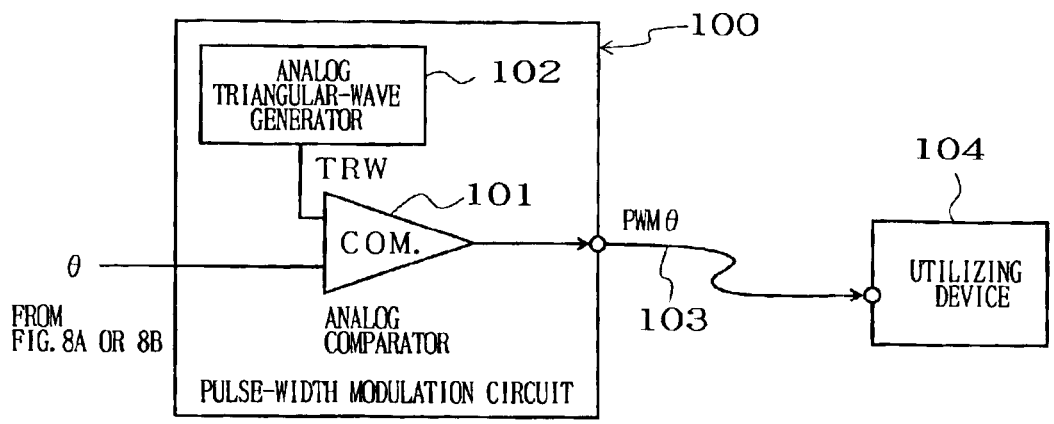
FIG. 11A is a block diagram showing an arrangement where analog position detection data output from an analog phase detection circuit, similar to the one shown in FIG. 8A or 8B, is transmitted after being subjected to pulse width modulation.
Figure 11B:
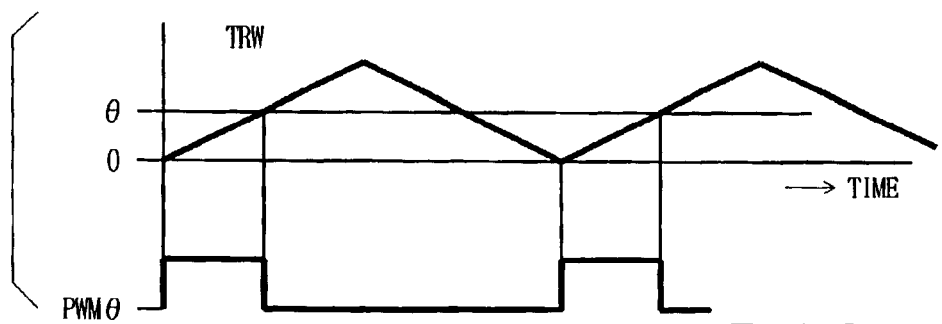
FIG. 11B is a waveform diagram showing how the pulse@width modulation is performed in the arrangement of FIG. 11A.
Figure 11C:
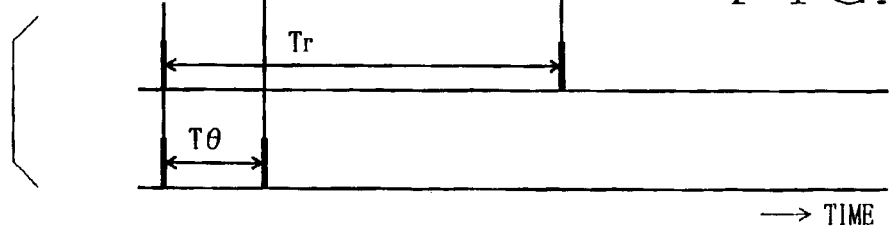
FIG. 11C is a timing chart explanatory of exemplary procedures by which a utilizing device of FIG. 11 reproduces the position detection data.

In each of the above-described embodiments, the known pulse-width modulation technique may be employed when position detection data $\theta$ indicative of a position detected in an analog or digital manner is to be transmitted via the wirings or lines to another device utilizing the detection data $\theta$ ("utilizing device"). FIG. 11A shows a modified embodiment where analog position detection data $\theta$ output from an analog phase detection circuit, similar to that of FIG. 8A or 8B, is modulated in pulse width via a pulse-width modulation circuit 100. For example, the pulse-width modulation circuit 100 includes an analog comparator 101 and an analog triangular-wave generator circuit 102. FIG. 11B is a diagram showing how the pulse-width modulation circuit 100 performs the pulse width modulation. Namely, the analog comparator 101 makes a comparison between the analog position detection data $\theta$ and an analog triangular-wave signal, TRW generated by the analog triangular-wave generator circuit 102 and thereby outputs a pulse-width-modulated position detection signal PWM$\theta$ having a pulse width corresponding to a voltage level or value of the detection data $\theta$. This pulse-width-modulated position detection signal PWM$\theta$ is supplied via wirings 103 to a utilizing device 104, which utilizes the supplied position detection signal PWM$\theta$ in a desired manner. For instance, the utilizing device 104 may reproduce, from the pulse-width-modulated position detection signal PWM$\theta$, the position detection data $\theta$ as an analog or digital value. FIG. 11C is a timing chart explanatory of an exemplary manner in which the position detection data $\theta$ is reproduced by the utilizing device 104. From the pulse-width-modulated position detection signal PWM$\theta$, data T$\theta$ indicative of the pulse width of the signal PWM$\theta$ is created by digital count or analog integration. The thus-created data T$\theta$ may be utilized directly as the position detection data $\theta$; however, to compensate for any possible error due to a variation in the period of the analog triangular-wave signal TRW resulting from a temperature change and the like, it is more preferable that a pulse period Tr of the pulse-width-modulated position detection signal PWM$\theta$ be determined through the digital count or analog integration to thereby provide a ratio of the pulse period Tr to the data T$\theta$. For example, assuming that TR/2 corresponds to a 360° phase of the position detection data $\theta$, the position detection data $\theta$ can be reproduced by performing an arithmetic operation of "2T$\theta$/Tr".

It should be appreciated that the pulse-width modulation circuit 100 may perform the pulse width modulation using any other suitable circuit than the triangular-wave generator circuit 102, such as an analog sawtooth-wave generator circuit. Further, of course, the period of the pulse-width-modulating analog triangular-wave signal TRW may be set to have no relation whatsoever to an exciting A.C. signal sin ω, and it may be set in any desired manner. Transmitting the position detection data $\theta$ after having been subjected to the pulse width modulation, as in the example of FIG. 11A, is advantageous in the following respect. Namely, where the utilizing device 104 is considerably remote from the sensor, the transmission wirings 103 have to have an increased length, which would undesirably result in analog voltage level variations due to impedance variations by the influence of wiring capacity, noise, temperature changes, etc. However, the use of the pulse-width-modulated position detection signal PWM$\theta$ in the modified example can reliably avoid adverse effects of such analog voltage level variations, thereby constantly guaranteeing a high detection accuracy.

Figure 12A:
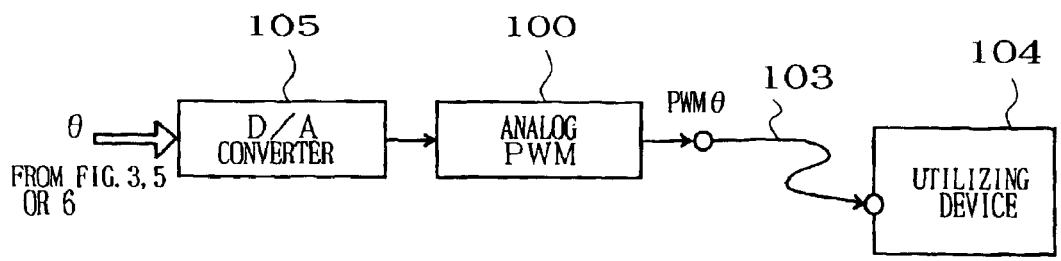
FIG. 12A is a block diagram showing an arrangement where digital position detection data output from a digital phase detection circuit, similar to the one shown in FIG. 3, 5 or 6, is subjected to pulse width modulation.
Figure 12B:
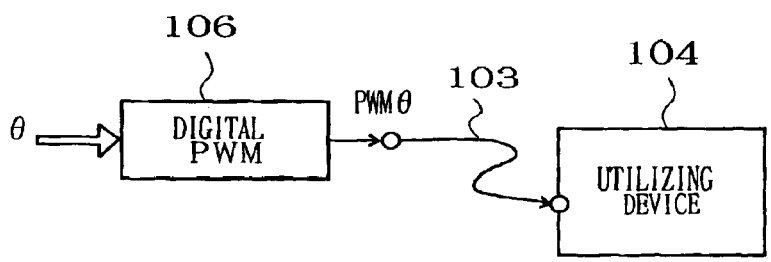
FIG. 12B is a block diagram showing another arrangement where digital position detection data output from a digital phase detection circuit, similar to the one shown in FIG. 3, 5 or 6, is subjected to pulse width modulation.

Further, FIGS. 12A and 12B show several other modified examples which are designed to modulate the pulse width of digital position detection data $\theta$ (or D) output from a digital phase detection circuit as shown in FIG. 3, 5 or 6. In the example of FIG. 12A, the digital position detection data $\theta$ (or D) is first converted into an analog signal, and the thus-converted analog signal is fed to an analog-type pulse width modulation circuit 100, similar to the one of FIG. 11A, so as to provide a pulse-width-modulated position detection signal PWM$\theta$. Further, in the example of FIG. 12 B, the digital position detection data $\theta$ (or D) is fed to a digital-type pulse width modulation circuit 106 so as to provide a pulse-width-modulated position detection signal PWM$\theta$. The digital-type pulse width modulation circuit 106 comprises, for example, digital versions of the comparator 101 and triangular-wave generator circuit 102 shown in FIG. 11A, and the pulse width modulating operation in the example of FIG. 12B may be substantially the same as in the example of FIG. 11B. Transmitting the digital position detection data $\theta$ (or D) after having been subjected to pulse width modulation as in the examples of FIGS. 12A and 12B is advantageous in that the necessary number of the wirings 103 for transmitting the pulse-width-modulated position detection signal PWM$\theta$ can be far smaller than the necessary number of the wirings for transmitting the digital data in a parallel fashion. It is also advantageous in that it can eliminate the need for parallel-to-serial conversion of the digital data at a transmitting end, serial-to-parallel conversion of the digital data at a receiving end and synchronizing between the parallel-to-serial conversion and the serial-to-parallel conversion and thereby reduce the costs as compared to the case where the digital data is transmitted in a serial fashion.

Figure 13:
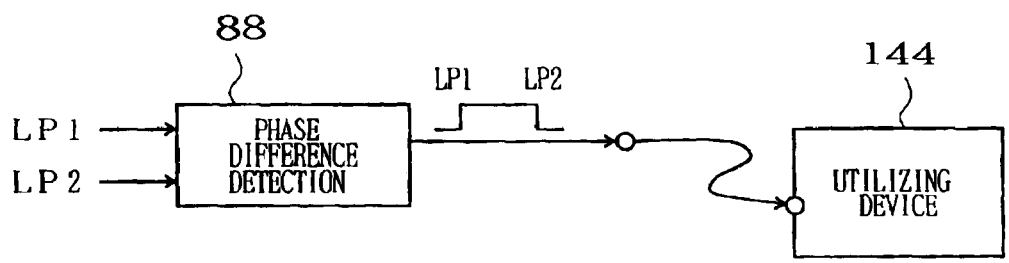
FIG. 13 is a block diagram showing another arrangement where a signal formed by pulse-width modulating the position detection data is generated on the basis of two zero-cross detection pulses output from the zero-cross detection circuit of FIG. 3 using the same phase difference detection circuit as shown in FIG. 8B.

FIG. 13 shows still another modified example which employs a phase difference detection circuit 88 similar to that shown in FIG. 8B and where zero-cross detection pulses LP1 and LP2 output from the two zero-cross detection circuits 47 and 48 of FIG. 3 are fed to the phase difference detection circuit 88 so that a gate pulse, having a time width corresponding to a difference between the times of generation of the zero-cross detection pulses, is generated and output directly as a pulse-width-modulated position detection signal PWM$\theta$. By transmitting the pulse-width-modulated position detection signal PWM$\theta$, this example can dispense with the related circuits and thereby significantly reduce the necessary costs while still affording the benefit of providing position detection data whose errors due to temperature drift etc. have been appropriately compensated for as in the example of FIG. 8B.

The present invention should not be construed as limited only to the above-described embodiments, and may be modified in a variety of ways. Further, although the arithmetic operations according to the present invention can of course be carried out via a hardware device based on hard-wired logic using an IC, LSI, gate arrays or a group of other discrete circuits, the present invention is not limited to such arrangements. For example, a software program may be built to perform functions equal to the arithmetic and other operations as described above in relation to the embodiments of the present invention, and this program may be executed by a computer, microprocessor or DSP (Digital Signal Processor). Circuits recited in the claims of the present application should be construed as embracing equivalent circuit functions that are implemented by a computer or electronic circuit group within a processor executing the software program. In addition, implementing the claimed invention via a hybrid combination of a hardware device or circuits having fixed functions and software-processed circuit functions is also within the scope of the present invention.

What is claimed is:

1. A phase difference detection device for detecting a phase difference between first and second A.C. signals based on output signals from a position detector, said phase difference having a value corresponding to a position-to-be-detected, said phase difference detection device comprising:
   a first circuit that performs an operation between said first and second A.C. signals so as to synthesize a first data signal having an electric phase angle shifted in one of positive and negative directions in correspondence to the position-to-be-detected;
   a second circuit that performs an operation between said first and second A.C. signals so as to synthesize a second data signal having an electric phase angle shifted in other of positive and negative directions in correspondence to the position-to-be-detected;
   a first operation circuit operatively coupled to said first circuit to measure an electric phase difference between said predetermined reference signal and said first data signal to obtain first phase data;
   a second operation circuit operatively coupled to said second circuit to measure an electric phase difference between said predetermined reference signal and said second data signal to obtain second phase data; and
   a third operation circuit operatively coupled to said first and second operation circuit to calculate position detection data corresponding to the position-to-be-detected on the basis of said first and second phase data.

2. A phase difference detection device as claimed in claim 1, which further comprises a pulse-width modulation circuit coupled to said third operation circuit to generate a signal pulse-width-modulated in accordance with the position detection data.

3. A phase difference detection device as claimed in claim 1 wherein said third operation circuit obtains the position detection data as analog position detection data.

4. A phase difference detection device as claimed in claim 1 wherein said third operation circuit obtains the position detection data as digital position detection data.

5. A phase difference detection device for detecting a phase difference between first and second A.C. signals based on output signals from a position detector, said phase difference having a value corresponding to a position-to-be-detected, said phase difference detection device comprising:
   a first circuit that performs an operation between said first and second A.C. signals so as to synthesize a first data signal having an electric phase angle shifted in one of positive and negative directions in correspondence to the position-to-be-detected:
   a second circuit that performs an operation between said first and second A.C. signals so as to synthesize a second data signal having an electric phase angle shifted in other of positive and negative directions in correspondence to the position-to-be-detected; and
   a third circuit operatively coupled to said first and second circuit to generate, on the basis of a difference between said first data signal and said second data signal, a signal pulse-width-modulated in accordance with position data indicative of the position-to-be-detected.

6. A method of detecting a phase difference between first and second A.C. signals based on output signals from a position detector, said phase difference having a value corresponding to a position-to-be-detected, said method comprising the steps of:
   forming first and second data signals from said first and second A.C. signals, said first data signal having an electric phase angle shifted in a positive direction in correspondence to the position-to-be-detected, said second data signal having an electric phase angle shifted in a negative direction in correspondence to said position-to-be-detected;
   measuring an electric phase difference between a predetermined reference signal and said first data signal to obtain first phase data;
   measuring an electric phase difference between said predetermined reference signal and said second data signal to obtain second phase data; and
   operating position detection data corresponding to the position-to-be-detected on the basis of said first and second phase data.

7. A method as claimed in claim 6, which further comprises a step of generating a signal pulse-width-modulated in accordance with the position detection data.

8. A method of detecting a phase difference between first and second A.C. signals based on output signals from a position detector, said phase difference having a value corresponding to a position-to-be-detected, said method comprising the steps of:
   forming first and second data signals from said first and second A.C. signals, said first data signal having an electric phase angle shifted in a positive direction in correspondence to the position-to-be-detected, said second data signal having an electric phase angle shifted in a negative direction in correspondence to said position-to-be-detected; and
   on the basis of a difference between said first data signal and said second data signal, generating a signal pulse-width-modulated in accordance with position data indicative of the position-to-be-detected.

* * * * *